United States Patent
Tillement et al.

(10) Patent No.: US 8,256,485 B2
(45) Date of Patent: Sep. 4, 2012

(54) DEVICE FOR SEPARATING AND DISCHARGING TRIMMINGS CUT IN A PRE-IMPREGNATED STRIP

(75) Inventors: Pierre André Henri Tillement, Decazeville (FR); Benoît Arnaud Gardelle, Capdenac (FR)

(73) Assignee: Forest-Line Capdenac (FR)

( * ) Notice: Subject to any disclaimer, the term of this patent is extended or adjusted under 35 U.S.C. 154(b) by 341 days.

(21) Appl. No.: 12/594,022

(22) PCT Filed: Feb. 20, 2008

(86) PCT No.: PCT/FR2008/000220
§ 371 (c)(1),
(2), (4) Date: Jan. 4, 2010

(87) PCT Pub. No.: WO2008/135645
PCT Pub. Date: Nov. 13, 2008

(65) Prior Publication Data
US 2010/0108265 A1 May 6, 2010

(30) Foreign Application Priority Data
Apr. 2, 2007 (FR) .................................... 07 02389

(51) Int. Cl.
*B32B 38/10* (2006.01)
(52) U.S. Cl. ........ 156/758; 156/707; 156/715; 156/716; 156/719; 156/759; 156/765; 156/767
(58) Field of Classification Search .................. 156/715, 156/716, 719, 759, 765, 767, 707, 758
See application file for complete search history.

(56) References Cited

U.S. PATENT DOCUMENTS

| | | | | |
|---|---|---|---|---|
| 3,772,123 A | * | 11/1973 | Clark et al. | 156/357 |
| 4,842,684 A | | 6/1989 | Tillement et al. | |
| 5,397,415 A | * | 3/1995 | Manabe et al. | 156/234 |
| 5,587,043 A | | 12/1996 | Hying et al. | |
| 6,467,382 B1 | * | 10/2002 | Willits et al. | 83/27 |
| 7,763,138 B2 | * | 7/2010 | Pfitzner et al. | 156/247 |
| 8,029,642 B2 | * | 10/2011 | Hagman | 156/715 |
| 8,048,261 B2 | * | 11/2011 | Mc Cowin | 156/719 |
| 8,052,835 B2 | * | 11/2011 | Merrill et al. | 156/707 |

FOREIGN PATENT DOCUMENTS

| | | |
|---|---|---|
| EP | 0 144 927 A2 | 6/1985 |
| FR | 2 656 290 A1 | 6/1991 |
| GB | 1 377 443 A | 12/1974 |
| WO | WO 01/56754 A | 8/2001 |

OTHER PUBLICATIONS

International Search Report dated Oct. 17, 2008, issued in corresponding international application No. PCT/FR2008/000220.

* cited by examiner

*Primary Examiner* — Mark A Osele
(74) *Attorney, Agent, or Firm* — Ostrolenk Faber LLP

(57) ABSTRACT

The invention comprises separating the strippings of a strip of paper and of a precut prepreg into strippings to be discarded and blanks to be kept using a suction roller that is tangent to the strip along an action line. In a downstream position, a device collects the blanks on said rectilinear path, and a device closer to the roller discharges the strippings. The paper runs through the device along said rectilinear path while maintaining the blanks thereon, and a strip temporary diversion device, capable of orthogonal movement relative to the strip, temporarily diverts the strip and brings it closer to the roller in order to facilitate the initial peeling of the strippings.

8 Claims, 1 Drawing Sheet

US 8,256,485 B2

DEVICE FOR SEPARATING AND DISCHARGING TRIMMINGS CUT IN A PRE-IMPREGNATED STRIP

CROSS REFERENCE TO RELATED APPLICATIONS

The present application is a 35 U.S.C. §371 National Phase conversion of PCT/FR2008/00220, filed Feb. 20, 2008, which claims benefit of French Application No. 0702389, filed Apr. 2, 2007, the disclosure of which is incorporated herein by reference. The PCT International Application was published in the French language.

BACKGROUND OF THE INVENTION

The invention relates to a device for separating and discharging trimmings on a cutting machine.

It is known practice, for example through document U.S. Pat. No. 4,842,684, to automatically deposit on a mold or depositing tool, by virtue of a robot furnished with a drape-molding head, a strip or a sheet of fibers for the manufacture of various parts such as aircraft wings, based on a composite strip consisting of bonded fiber elements (carbon, glass, Kevlar®, etc.), by impregnation of a heat-curable or thermoplastic resin, and supported on a backing tape made of paper or of plastic film. The composite tape is unwound from a reel in order to pass over the drape-molding head where the tape of prepreg fibers is separated from the backing tape, the latter being returned to a winding mandrel, while the prepreg is applied to the mold or the previous layers already deposited, via a compacting member usually consisting of a roll or an applicator shoe connected to the drape-molding head.

Because of the shapes of the parts produced, and notably because of their edges, it is necessary not only to deposit "full width" sections of tape, with four sides, but also sections of various shapes, obtained by complex cutting of the tape. The section which will be deposited is called a "panel" and the section between the cutaway panels is called the "trimming" which will be discarded.

For the simple-shaped through-cuts, a single-phase deposit process is used which comprises the cutting in situ of the strips to be deposited and their immediate depositing by the same machine. A mechanical or ultrasonic knife cuts the prepreg tape directly on its backing paper without cutting the latter which will be rerolled onto the mandrel after stripping.

For the strips to be cut in complex shapes, the Applicant has perfected a two-phase method, according to which the cutting is carried out upstream of the depositing process itself, with a first specialized machine in which the successive precut sections are deposited on a backing tape or between two protectors and wound onto a cassette installed on the drape-molding head.

This first machine therefore carries out the cutting of the panels, the stripping of the paper backing, the discharging of the trimmings and the repackaging of the panels.

The Applicant has also disclosed, in document FR 2 656 290, a device for separating and discharging trimmings cut away in a strip of material, in which the trimmings are diverted from their rectilinear path by a suction roll and they are discharged by removal rolls. FIG. 1 of the present document shows the prior art. The strip is presented upstream of the device in the form of a complex 3 linking together a thickness of backing tape 1 and a thickness of prepreg 2 which has been previously cut away on the backing tape without cutting the latter by cutting means not shown upstream of the device. The prepreg 2 usually consists of uni-directional carbon fibers immersed in a flexible matrix of bonding resin. There are therefore in the cutaway prepreg 2 useful zones 2' called panels which must be retained and will be repackaged and trimmings zones 2" which must be discharged by the device. The latter essentially comprises a suction roll or drum 10 comprising suction zones of adjustable extent. Just upstream of the drum 10, a stripping edge 11 makes it possible to strip the backing tape 1 so that only the prepreg 2 passes in front of the active portion of the drum 10. If there is suction, which the control program initiates as a function of the cutaway elements of the prepreg 2, the part 2" to be discharged follows the periphery of the drum 10 and is rapidly collected by removal rolls 12 in order to be carried to a waste can. If there is no suction, the retained portion 2' of prepreg 2 continues its rectilinear path in order to be collected in a repackaging jaw formed by two linked rolls 13 which deliver around the retained cutaway elements or panels 2' two repackaging films 14 so as to form downstream a complex 4 of cutaway elements of repackaged prepreg which will be wound onto a cassette in order to be used in a depositing machine.

According to this known device, there is a transfer zone A, between the nose of the stripping edge 11 and the repackaging jaw 13, where the panels 2' that are to be repackaged are not guided.

Finally, with this method, during the deposition, the side of the deposited panel is inverted relative to the strips deposited by the depositing machines in the single-phase method.

Known through document WO 01/56754 is a device which makes it possible to separate the cutaway elements produced in a sheet of metal or of cardboard by virtue of a diversion roll which directly sets aside the cutaway sheet considered to be a trimming and leaves the cutaway elements to be stacked downstream of the device. To the extent that it is not a cutting of prepregs, that is to say of bonding elements, which must be deposited on a backing strip, this document does not relate to the problem of the invention, namely the correct positioning of the prepregs after the discarding of the trimmings.

SUMMARY OF THE INVENTION

The object of the invention is to propose a new device for separating and discharging the trimmings which improves the accuracy of positioning of the panels on deposition.

The invention achieves its objective by virtue of a device for separating and discharging trimmings from a strip of material carried on a substantially rectilinear path, the strip comprising a thickness of continuous backing tape and a thickness of cutaway material comprising trimmings to be discarded and panels to be retained, the device comprising a rotating suction roll placed transversely to the path and tangential to the strip along an action line, and downstream of said action line on the one hand a device for collecting the panels situated substantially on said rectilinear path, and, on the other hand, a device for discharging the trimmings situated closer to the periphery of said roll, characterized in that the continuous backing tape passes through the device along said rectilinear path while permanently retaining on it the panels and in that the device comprises a device for temporary diversion of the strip, that can move at right angles to the strip, placed between said action line and said device for collecting the panels, in order to temporarily divert the path of the strip while bringing it closer to the roll, and as a result the initial stripping of the trimmings is made easier by the temporary diversion imposed by said diversion device.

Therefore, according to the invention, on the one hand the backing tape of the composite strip is not stripped upstream of the roll but is retained all along the device and, on the other hand, the stripping, which concerns only the trimmings to be discarded, is carried out downstream of the action line of the roll. Because the strip backing is retained with its panels to be retained still in place, there is no risk of incorrect positioning of these panels. The invention makes it possible to do away with the repackaging films of the prior art.

The stripping of the trimmings is carried out under the dual effect of the selective suction of the roll and of the angle of diversion conferred by the downthrust of the diversion device in the strip during the passage of a cutaway element to be discarded, at least at the beginning of this passage.

The device for collecting the panels, still in place on the original backing, may consist of any strip-guidance device placed downstream of the path, close to the suction roll, the strip being able to be carried by traction from the cassette-winding station where the strip furnished with its panels is rewound.

Advantageously, close to the action line, a path-containment backing roll is provided, associated with the suction roll and with the diversion device in order to generate a diversion that is sufficiently of a kind to promote the stripping during the downthrust of the diversion device. In other words, this involves temporarily giving the strip that is running a path that is sufficiently angular in order to allow the trimming to be easily unstuck, with the aid of the suction of the roll. Advantageously, the diversion device comprises an edge or a stripping roll.

Preferably also provided close to the action line, upstream and downstream of the path, are path-containment presser rolls preventing the strip from swelling during the descent of the diversion device.

Advantageously, the downstream presser roll is associated with the downstream backing roll and forms the device for collecting the strip furnished with the retained cutaway elements.

The device for discharging the cutaway elements to be discarded advantageously consists of rolls or conveyor belts directing the cutaway elements to a waste can.

The diversion device may be continuous or segmented in the transverse direction of the strip in order to act locally on the width of the strip depending upon the shape of the trimming to be discharged.

BRIEF DESCRIPTION OF THE DRAWINGS

Other features and advantages of the invention will appear on reading the following description, with reference to the appended drawings in which.

DESCRIPTION OF PREFERRED EMBODIMENTS

Figure 1:
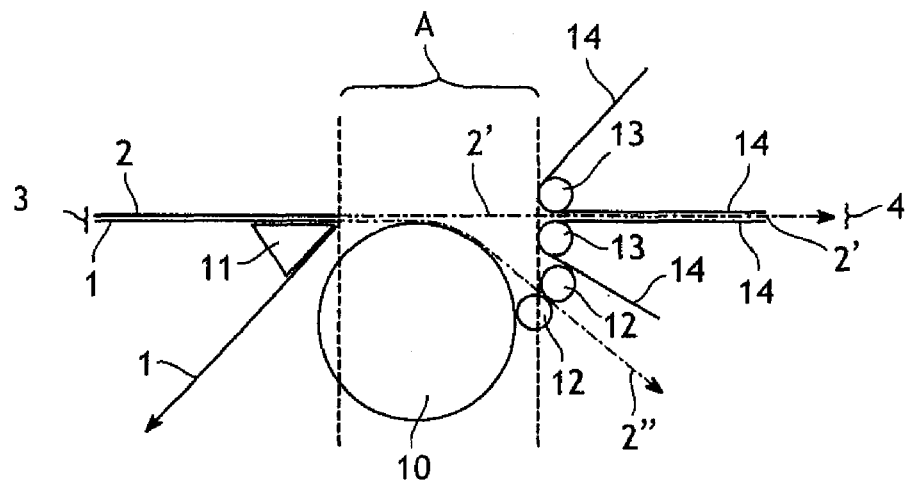
FIG. 1 is a schematic side view of a separation and discharge device of the prior art.

FIG. 1 has already been described. For FIGS. 2 and 3 relating to the invention, the same reference numbers will be used when they designate the same elements as in the prior art.

Figures 2, 3:
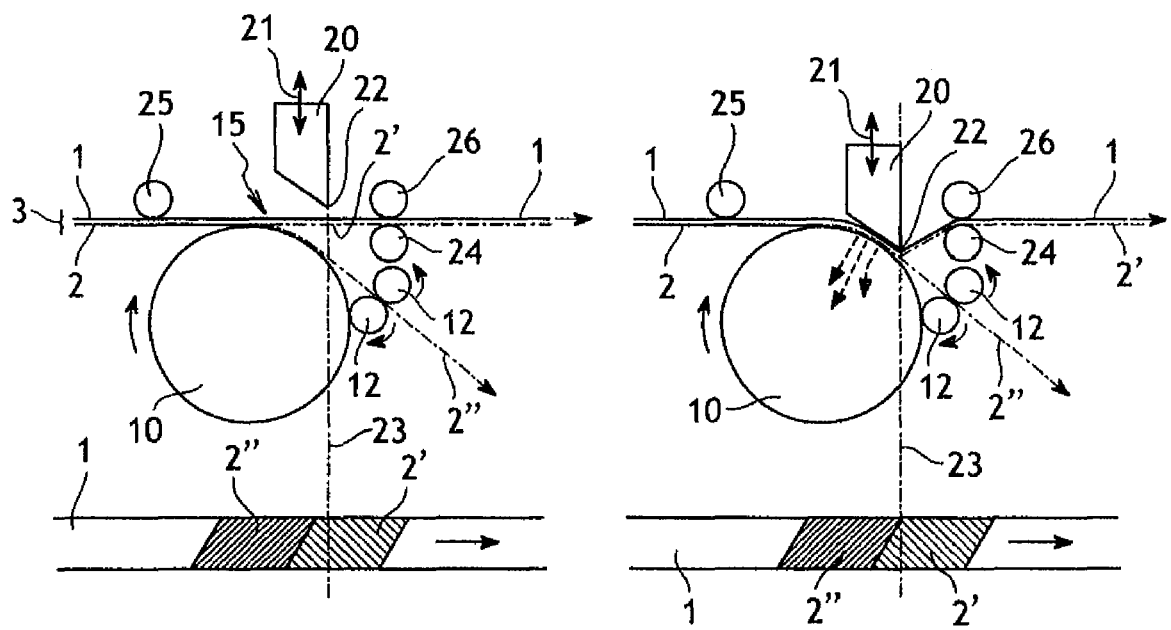
FIG. 2 combines a schematic side view of a separation and discharge device according to the present invention and a top view of the strip of cutaway elements, the diversion device being in the raised position.
FIG. 3 combines a schematic side view of a separation and discharge device according to the present invention and a top view of the strip of cutaway elements, the diversion device being in the lowered position.

The complex 3 formed by the thickness of paper 1 and by the thickness of precut prepreg 2 is supplied upstream of the device on a generally rectilinear path that the paper 1 travels to downstream of the device. The cutaway elements of prepreg 2 on the paper 1 comprise, as is shown at the bottom of FIG. 2 or 3, cutaway elements to be retained or panels 2' alternating with cutaway elements to be discarded or trimmings 2" separated by a cut line which may notably be an oblique line. Only two have been shown in order to simplify the drawing. According to the invention, the panels 2' must traverse the device while remaining attached to their backing paper 1 while the trimmings 2" must be discharged by virtue of said device which comprises a rotary suction roll 10 similar to that of the prior art, that is to say capable of offering a suction surface at the correct moment when a trimming 2" is presented at the action line 15 situated in the location where the roll 10 comes tangential to the rectilinear path of the complex strip 3.

In order to promote the stripping of the trimming 2" of the backing paper 1, the invention proposes, just downstream of the action line 15, a diversion member 20 that can move vertically (the double arrow 21) between a retracted position or raised position (FIG. 2), out of the path of the strip and not interfering with it, and a descended or a lowered position (FIG. 3), in which the diversion member 20 presses on the strip 3, on the side of the paper 1, via its edge-shaped end 22.

When, as can be seen at the bottom of FIG. 3, the beginning of a trimming 2" is detected to approach the level of the edge 22, marked by the line 23, the device for driving the machine lowers the diversion member 20 (cf. FIG. 3) so that it presses the strip 3 downward, against the periphery of the roll 10 (the chamfered shape of the end of the member 20 allows it to approach this periphery as closely as possible). By virtue of a pressing backing roll 24 situated nearby downstream, adjacent to the axis of the rectilinear path of the strip, the path of the strip is temporarily changed to substantially form an angle the apex of which corresponds to the edge 22 so that the stripping of the trimmings 2" is promoted: from this point on, the strip retains only the paper 1 and the panels 2' and passes onto the backing roll 24, while the trimmings 2", sucked by the drum are carried to a waste can, optionally by means of carrying rolls 12 or conveyor belts similar to those of the prior art. Once the beginning of the trimming 2" is correctly stripped of the backing paper and engaged in the rolls 12, the diversion member 20 can be brought back up to its raised position, the stripping continuing on its own by pulling.

In order to prevent the downthrust of the diversion member 20 by reaction causing the strip 3 to swell on either side of the diversion member 20, two rolls 25, 26 are placed above the strip in order to contain its upward path. The downstream roll 26 is advantageously coupled with the roll 24 in order to form a pair of cooperating rolls serving as a strip collection device, the driving of the latter being provided by a cassette-winding device not shown situated downstream.

What is claimed is:

1. A device for separating and discharging trimmings from a strip of material carried on a substantially rectilinear path, the strip comprising a thickness of continuous backing tape and a thickness of cutaway material comprising trimmings to be discarded and panels to be retained, the device comprising a rotating suction roll placed transversely to the path and tangential to the strip along an action line, and downstream of said action line on the one hand a device for collecting the panels situated substantially on said rectilinear path, and, on the other hand, a device for discharging the trimmings situated closer to the periphery of said roll, wherein the continuous backing passes through the device along said rectilinear path while permanently retaining on it the panels and in that the device comprises a device for temporary diversion of the strip, that can move at right angles to the strip, placed between said action line and said device for collecting the panels, in order to temporarily divert the path of the strip while bringing it closer to the roll, and as a result the initial stripping of the trimmings is made easier by the temporary diversion imposed by said diversion device, wherein the diversion device is segmented in order to act locally on the width of the strip depending on the shape of the trimming to be discharged.

2. The device as claimed in claim 1, wherein, close to the action line, a path-containment backing roll is provided, associated with the suction roll and with the diversion device in order to generate a diversion that is sufficiently of a kind to promote the stripping during the downthrust of the diversion device.

3. The device as claimed in claim 1, wherein, close to the action line, upstream and downstream of the path, path-containment presser rolls are provided preventing the strip from swelling during the descent of the diversion device.

4. The device as claimed in claim 3, wherein the path-containment presser rolls includes an upstream and a downstream presser roll and the downstream presser roll is associated with a downstream backing roll.

5. The device as claimed in claim 3, wherein the downstream presser roll is associated with the downstream backing roll.

6. The device as claimed in claim 1, wherein the device for discharging the trimmings to be discarded advantageously comprises rolls or conveyor belts directing the trimmings to a waste can.

7. The device as claimed in 1, wherein the diversion device is continuous.

8. The device as claimed in claim 1, wherein the cutaway material consists of prepregs.

* * * * *